US012647998B2

(12) United States Patent
 Liu

(10) Patent No.:  US 12,647,998 B2
(45) Date of Patent:   Jun. 2, 2026

(54) METHOD AND APPARATUS FOR ADJUSTING MAXIMUM NUMBER OF TRANSPORT LAYERS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 361 days.

(21) Appl. No.: 18/549,956

(22) PCT Filed: Mar. 11, 2021

(86) PCT No.: PCT/CN2021/080325
§ 371 (c)(1),
(2) Date: Sep. 11, 2023

(87) PCT Pub. No.: WO2022/188115
PCT Pub. Date: Sep. 15, 2022

(65) Prior Publication Data
US 2024/0163895 A1     May 16, 2024

(51) Int. Cl.
 *H04W 72/231*     (2023.01)
 *H04B 7/0413*     (2017.01)
 *H04W 28/20*     (2009.01)
(52) U.S. Cl.
 CPC ........ *H04W 72/231* (2023.01); *H04B 7/0413* (2013.01); *H04W 28/20* (2013.01)
(58) Field of Classification Search
 CPC ... H04W 72/231; H04W 28/20; H04W 52/02; H04B 7/0413; H04L 5/00
 See application file for complete search history.

(56) References Cited

U.S. PATENT DOCUMENTS

2019/0174466 A1 *  6/2019  Zhang ................... H04L 5/0057
2019/0281588 A1 *  9/2019  Zhang ................... H04W 52/08
(Continued)

FOREIGN PATENT DOCUMENTS

CN      110831130 A      2/2020
CN      112332891 A      2/2021
(Continued)

OTHER PUBLICATIONS

International Search Report issued Dec. 8, 2021 in PCT/CN2021/080325, filed on Mar. 11, 2021, 4 pages (with English Translation).
(Continued)

*Primary Examiner* — Ayaz R Sheikh
*Assistant Examiner* — Tarell A Hampton
(74) *Attorney, Agent, or Firm* — Oblon, McClelland, Maier & Neustadt, L.L.P.

(57) ABSTRACT

Provided is a method and an apparatus for adjusting a maximum number of transport layers. The method can include configuring or updating, by a network device, a target value of a maximum number of uplink and/or downlink transport layers of a terminal device over an activated BWP, where the target value is selected in a configuration set for a number of transport layers corresponding to the BWP. The method can further include indicating, by the network device, the target value of the maximum number of uplink and/or downlink transport layers to the terminal device.

20 Claims, 5 Drawing Sheets

A network device configures or updates a target value of a maximum number of uplink and/or downlink transport layers of a terminal device over an activated Bandwidth Part, BWP, the target value being a configuration value in a configuration set for the number of transport layers corresponding to the BWP  /— S201

The network device indicates the target value of the maximum number of uplink and/or downlink transport layers to the terminal device  /— S202

(56) References Cited

U.S. PATENT DOCUMENTS

| | | | | |
|---|---|---|---|---|
| 2019/0312617 A1* | 10/2019 | Wernersson | .......... | H04L 5/0048 |
| 2020/0100178 A1* | 3/2020 | Kim | .................. | H04W 52/0212 |
| 2020/0107353 A1* | 4/2020 | Jung | .................... | H04L 5/0053 |
| 2020/0154267 A1* | 5/2020 | Soriaga | .................... | H04W 8/24 |
| 2020/0212972 A1* | 7/2020 | Zhang | .................. | H04B 7/0628 |
| 2021/0067220 A1* | 3/2021 | Abdelghaffar | ........ | H04L 5/0023 |
| 2021/0105722 A1* | 4/2021 | Tsai | .................. | H04W 52/0235 |
| 2021/0242913 A1* | 8/2021 | Manolakos | ........... | H04W 72/51 |
| 2021/0352580 A1* | 11/2021 | Zhou | .................. | H04W 52/0209 |
| 2022/0070855 A1* | 3/2022 | Zhang | .................. | H04W 72/23 |
| 2022/0304024 A1* | 9/2022 | Maleki | .................. | H04B 7/063 |
| 2022/0311478 A1* | 9/2022 | Sun | ..................... | H04B 7/0413 |
| 2023/0209532 A1* | 6/2023 | Zhou | .................. | H04W 72/121 |

FOREIGN PATENT DOCUMENTS

| | | | |
|---|---|---|---|
| EP | 3 478 019 A1 | 5/2019 | |
| WO | WO 2018/084971 A1 | 5/2018 | |
| WO | WO 2020/000422 A1 | 1/2020 | |

OTHER PUBLICATIONS

Chinese Office Action issued Apr. 13, 2023 in CN 202180000679.2, 6 pages.

"Discussion on UE power saving for Rel-17 (RP-192569)" ZTE, Sanechips, 3GPP TSG RAN Meeting #86, 2019, 4 pages.

* cited by examiner

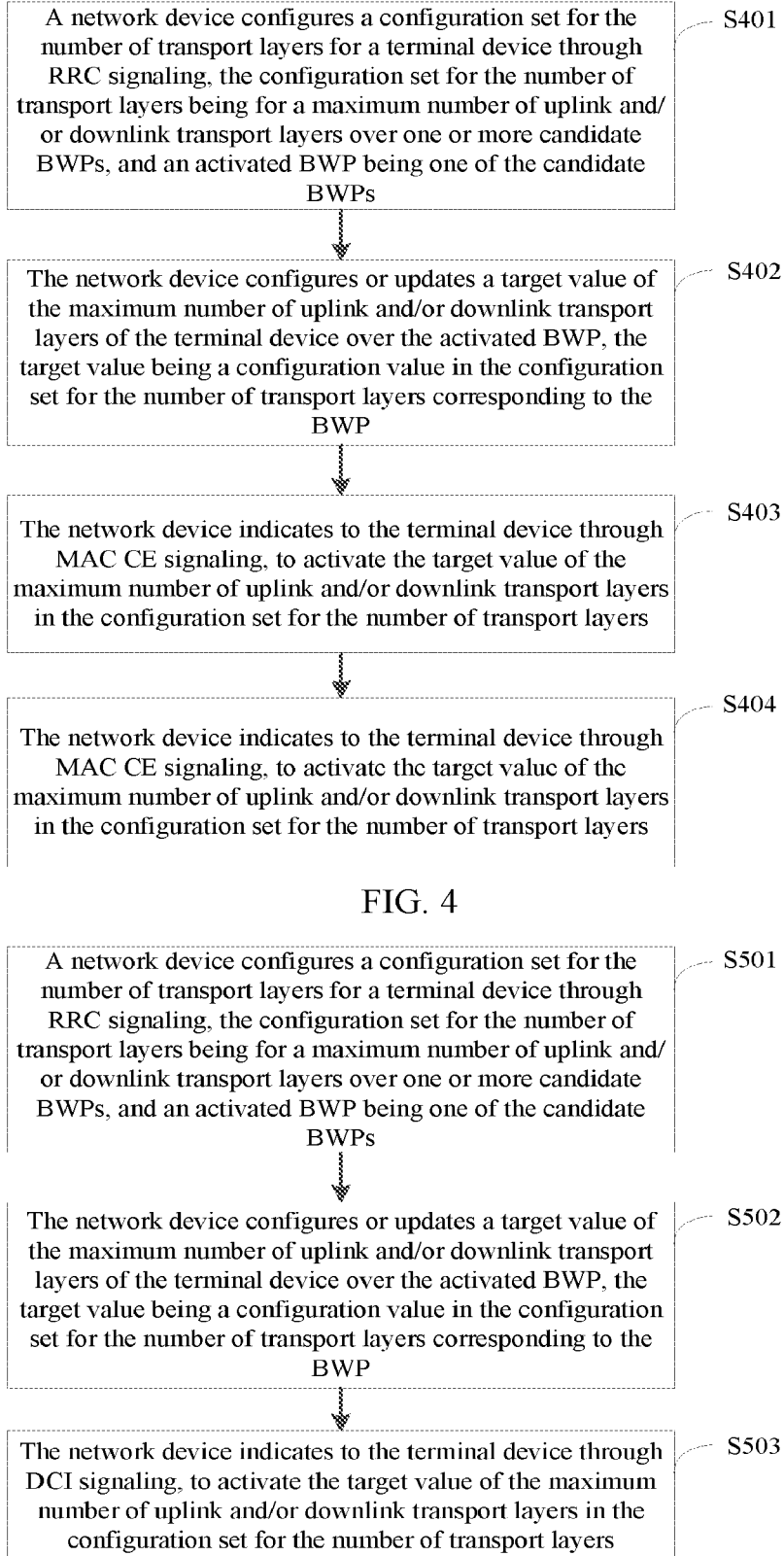

A network device configures a configuration set for the number of transport layers for a terminal device through RRC signaling, the configuration set for the number of transport layers being for a maximum number of uplink and/or downlink transport layers over one or more candidate BWPs, and an activated BWP being one of the candidate BWPs ⟶ S401

The network device configures or updates a target value of the maximum number of uplink and/or downlink transport layers of the terminal device over the activated BWP, the target value being a configuration value in the configuration set for the number of transport layers corresponding to the BWP ⟶ S402

The network device indicates to the terminal device through MAC CE signaling, to activate the target value of the maximum number of uplink and/or downlink transport layers in the configuration set for the number of transport layers ⟶ S403

The network device indicates to the terminal device through MAC CE signaling, to activate the target value of the maximum number of uplink and/or downlink transport layers in the configuration set for the number of transport layers ⟶ S404

FIG. 4

A network device configures a configuration set for the number of transport layers for a terminal device through RRC signaling, the configuration set for the number of transport layers being for a maximum number of uplink and/or downlink transport layers over one or more candidate BWPs, and an activated BWP being one of the candidate BWPs ⟶ S501

The network device configures or updates a target value of the maximum number of uplink and/or downlink transport layers of the terminal device over the activated BWP, the target value being a configuration value in the configuration set for the number of transport layers corresponding to the BWP ⟶ S502

The network device indicates to the terminal device through DCI signaling, to activate the target value of the maximum number of uplink and/or downlink transport layers in the configuration set for the number of transport layers ⟶ S503

FIG. 5

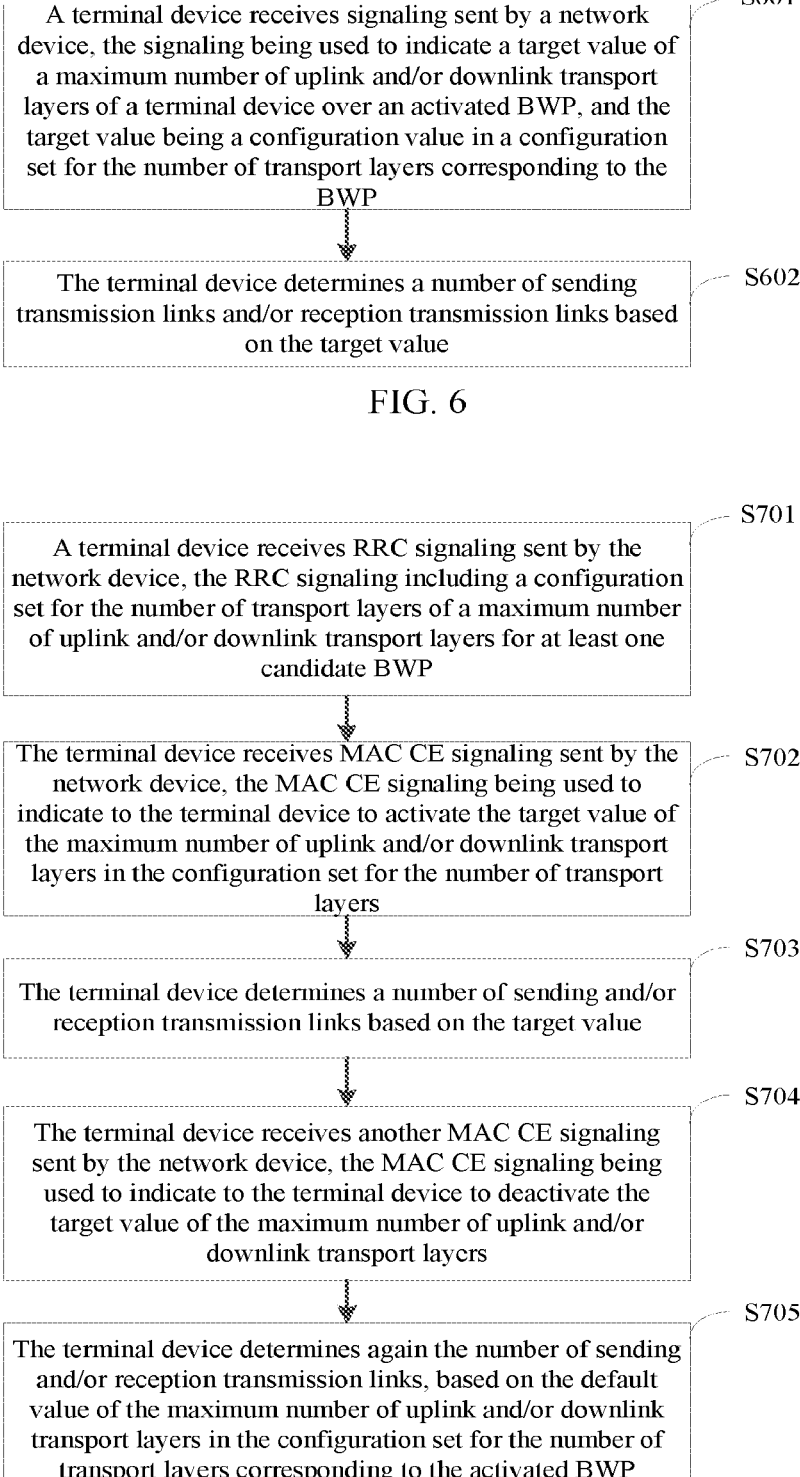

A terminal device receives signaling sent by a network device, the signaling being used to indicate a target value of a maximum number of uplink and/or downlink transport layers of a terminal device over an activated BWP, and the target value being a configuration value in a configuration set for the number of transport layers corresponding to the BWP — S601

The terminal device determines a number of sending transmission links and/or reception transmission links based on the target value — S602

FIG. 6

A terminal device receives RRC signaling sent by the network device, the RRC signaling including a configuration set for the number of transport layers of a maximum number of uplink and/or downlink transport layers for at least one candidate BWP — S701

The terminal device receives MAC CE signaling sent by the network device, the MAC CE signaling being used to indicate to the terminal device to activate the target value of the maximum number of uplink and/or downlink transport layers in the configuration set for the number of transport layers — S702

The terminal device determines a number of sending and/or reception transmission links based on the target value — S703

The terminal device receives another MAC CE signaling sent by the network device, the MAC CE signaling being used to indicate to the terminal device to deactivate the target value of the maximum number of uplink and/or downlink transport layers — S704

The terminal device determines again the number of sending and/or reception transmission links, based on the default value of the maximum number of uplink and/or downlink transport layers in the configuration set for the number of transport layers corresponding to the activated BWP — S705

FIG. 7

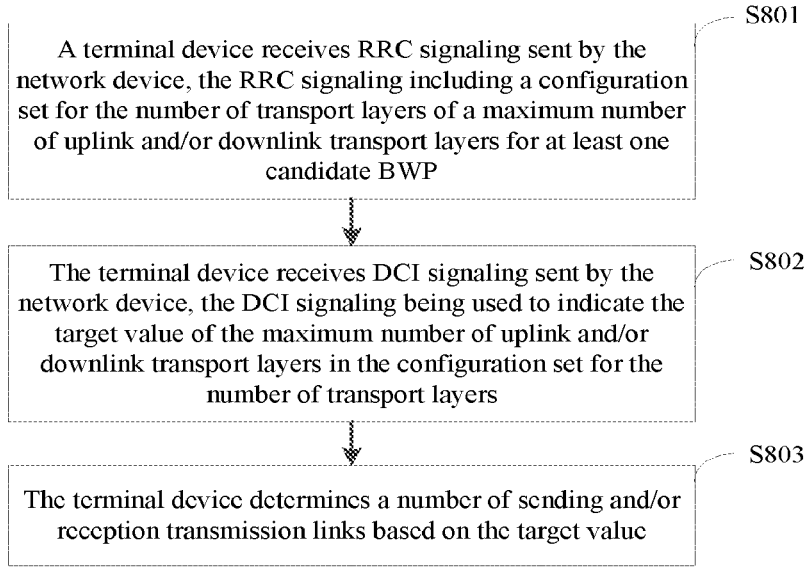

S801

A terminal device receives RRC signaling sent by the network device, the RRC signaling including a configuration set for the number of transport layers of a maximum number of uplink and/or downlink transport layers for at least one candidate BWP

S802

The terminal device receives DCI signaling sent by the network device, the DCI signaling being used to indicate the target value of the maximum number of uplink and/or downlink transport layers in the configuration set for the number of transport layers

S803

The terminal device determines a number of sending and/or reception transmission links based on the target value

Apparatus for adjusting a maximum number of transport layers

901

Transceiver module

902

Processing module

FIG. 9

METHOD AND APPARATUS FOR ADJUSTING MAXIMUM NUMBER OF TRANSPORT LAYERS

CROSS REFERENCE TO RELATED APPLICATION

The present disclosure is the U.S. national phase application of International Application No. PCT/CN2021/080325 filed on Mar. 11, 2021, the content of which is incorporated herein by reference in its entirety for all purposes.

BACKGROUND

Technical Field

The present disclosure relates to the field of communication technology, in particular to a method and an apparatus for adjusting a maximum number of transport layers.

Description of the Related Art

In the related technology, when the demand of a terminal device for the maximum number of transport layers in a Multiple-Input Multiple-Output (MIMO) system changes, it is necessary to adjust a maximum number of MIMO layers for the terminal device through BWP switching.

SUMMARY

In a first aspect, embodiments of the present disclosure provide a method for adjusting a maximum number of transport layers, which is applied to a network device. The method includes: configuring or updating, by the network device, a target value of a maximum number of uplink and/or downlink transport layers of a terminal device over an activated Bandwidth Part, BWP, wherein the target value is a configuration value in a configuration set for a number of transport layers corresponding to the BWP; and indicating, by the network device, the target value of the maximum number of uplink and/or downlink transport layers to the terminal device.

In a second aspect, embodiments of the present disclosure further provide a method for adjusting a maximum number of transport layers, which is applied to a terminal device. The method includes: receiving, by the terminal device, signaling sent by a network device, wherein the signaling is configured to indicate a target value of a maximum number of uplink and/or downlink transport layers of the terminal device over an activated BWP, wherein the target value is a configuration value in a configuration set for a number of transport layers corresponding to the BWP; and determining, by the terminal device, a number of sending and/or reception transmission links based on the target value.

In a third aspect, embodiments of the present disclosure provide an apparatus for adjusting a maximum number of transport layers, which can achieve some or all of functions of the network device in methods described in the first aspect. For example, the apparatus for adjusting a maximum number of transport layers can have some or all of functions in embodiments of the present disclosure, or can have the function of implementing any embodiment of the present disclosure separately. The functions described can be implemented through hardware or by executing corresponding software through hardware. The hardware or software includes one or more units or modules corresponding to the above functions.

In some embodiments, a structure of the apparatus for adjusting a maximum number of transport layers can include a transceiver module and a processing module. The processing module is configured to support the apparatus to implement corresponding functions in the above methods. The transceiver module is configured to support communication between the apparatus and other devices. The apparatus can further include a storage module, which is configured to couple with the transceiver module and the processing module, and stores the necessary computer programs and data the apparatus needs.

In some embodiments, the processing module can be a processor, the transceiver module can be a transceiver or a communication interface, and the storage module can be a memory.

In a fourth aspect, embodiments of the present disclosure provide an apparatus for adjusting a maximum number of transport layers, which can achieve some or all of functions of the network device in methods described in the second aspect. For example, the apparatus for adjusting a maximum number of transport layers can have some or all of functions in embodiments of the present disclosure, or can have the function of implementing any embodiment of the present disclosure separately. The functions described can be implemented through hardware or by executing corresponding software through hardware. The hardware or software includes one or more units or modules corresponding to the above functions.

In some embodiments, a structure of the apparatus for adjusting a maximum number of transport layers can include a transceiver module and a processing module. The processing module is configured to support the apparatus to implement corresponding functions in the above methods. The transceiver module is configured to support communication between the apparatus and other devices. The apparatus can further include a storage module, which is configured to couple with the transceiver module and the processing module, and stores the necessary computer programs and data the apparatus needs.

In some embodiments, the processing module can be a processor, the transceiver module can be a transceiver or a communication interface, and the storage module can be a memory.

In a fifth aspect, embodiments of the present disclosure provide a communication device, which includes a processor and a memory, wherein a computer program is stored in the memory, and the processor executes the computer program stored in the memory to cause the method described in the first aspect to be implemented by the device.

In a sixth aspect, embodiments of the present disclosure provide a communication device, which includes a processor and a memory, wherein a computer program is stored in the memory, and the processor executes the computer program stored in the memory to cause the method described in the second aspect to be implemented by the device.

In a seventh aspect, embodiments of the present disclosure provide a communication device, including a processor and an interface circuit, wherein the interface circuit is configured to receive code instructions and transmit the code instructions to the processor, and the processor is configured to run the code instructions to implement the method described in the first aspect.

In an eighth aspect, embodiments of the present disclosure provide a communication device, including a processor and an interface circuit, wherein the interface circuit is configured to receive code instructions and transmit the code instructions to the processor, and the processor is configured to run the code instructions to implement the method described in the second aspect.

In a ninth aspect, embodiments of the present disclosure provide a computer-readable storage medium for storing instructions, which when executed, cause the method described in the first aspect to be implemented.

In a tenth aspect, embodiments of the present disclosure provide a computer-readable storage medium for storing instructions, which when executed, cause the method described in the second aspect to be implemented.

BRIEF DESCRIPTION OF THE DRAWINGS

A more complete appreciation of the invention and many of the attendant advantages thereof will be readily obtained as the same becomes better understood by reference to the following detailed description when considered in connec- tion with the accompanying drawings, wherein:

FIG. 4 is a schematic flowchart of a method for adjusting a maximum number of transport layers according to embodi- ments of the present disclosure;

FIG. 5 is a schematic flowchart of a method for adjusting a maximum number of transport layers according to embodi- ments of the present disclosure;

FIG. 6 is a schematic flowchart of a method for adjusting a maximum number of transport layers according to embodi- ments of the present disclosure;

FIG. 7 is a schematic flowchart of a method for adjusting a maximum number of transport layers according to embodi- ments of the present disclosure;

FIG. 8 is a schematic flowchart of a method for adjusting a maximum number of transport layers according to embodi- ments of the present disclosure;

FIG. 9 is a schematic structural diagram of an apparatus for adjusting a maximum number of transport layers accord- ing to embodiments of the present disclosure;

Figure 1:
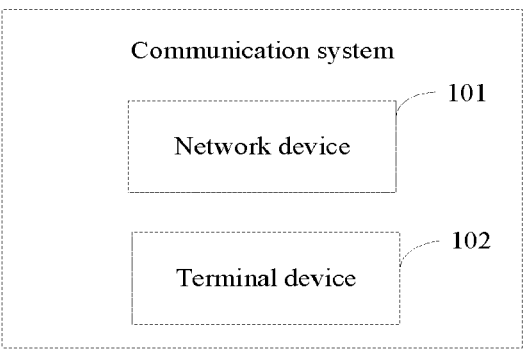
FIG. 1 is a schematic diagram of an architecture of a communication system according to embodiments of the present disclosure.

DETAILED DESCRIPTION OF THE
PREFERRED EMBODIMENTS

Referring now to the drawings, wherein like reference numerals designate identical or corresponding parts throughout the several views.

The following is a detailed explanation of embodiments of the present disclosure. Examples of the embodiments are shown in the drawings, in which the same or similar reference numerals throughout the disclosure represent the same or similar components or components with the same or similar functions. Embodiments described below with ref- erence to the drawings are exemplary and are intended to explain the present disclosure, but cannot be understood as limiting the present disclosure.

For ease of understanding, the terminology involved in present disclosure will be introduced first.
1. Bandwidth Part (BWP)

BWP is a bandwidth subset of a total bandwidth of a cell, which adjusts a reception bandwidth and a sending band- width of UE through the bandwidth adaption in NR, so that the reception bandwidth and the sending bandwidth of UE do not need to be as large as the bandwidth of the cell.
2. Radio Resource Control (RRC)

RRC is also known as Radio Resource Management (RRM) or Radio Resource Allocation (RRA), which refers to the management, control, and scheduling of wireless resources through certain strategies and means. While meet- ing the requirements of service quality, the utilization of limited wireless network resources is maximized to ensure that a planned coverage area is reached and to maximize the business capacity and the resource utilization.
3. Medium Access Control Layer Control Element (MAC CE)
4. Downlink Control Information (DCI)

DCI is carried over the Physical Downlink Control Chan- nel (PDCCH), and can include uplink and downlink resource allocation, hybrid automatic repeat request (HARQ) information, power control, etc. PDCCH is a physical channel used to carry downlink scheduling infor- mation.
5. Sounding Reference Signal (SRS)

SRS is a reference signal that can be used for channel estimation. In wireless communication, SRS is used to estimate the frequency domain information of the uplink channel and perform frequency selective scheduling, and SRS is used to estimate the downlink channel and perform downlink beamforming. The network device can calculate a signal-to-noise ratio of the channel based on SRS and allocate transmission resources to the terminal device based on the signal-to-noise ratio.

In order to better understand the method for adjusting a maximum number of transport layers provided in embodi- ments of the present disclosure, a communication system used in embodiments of the present disclosure will be first described in the following.

As shown in FIG. 1, a schematic diagram of an architec- ture of a communication system according to embodiments of the present disclosure is provided. The communication system can include, but is not limited to, a network device and a terminal device. The number and the implementation of devices shown in FIG. 1 are used for examples only and do not constitute a limitation on embodiments of the present disclosure. In practical applications, two or more network devices and two or more terminal devices can be included. The communication system shown in FIG. 1 including one network device 101 and one terminal device 102 is taken as an example.

It should be noted that technical solutions of embodiments of the present disclosure can be applied to various commu- nication systems. For example, long term evolution (LTE) systems, $5^{th}$ generation (5G) mobile communication sys- tems, 5G new radio (NR) systems, or other new mobile communication systems in the future.

The network device 101 in embodiments of the present disclosure is an entity on the network side for sending or receiving signals. For example, the network device 101 can be an evolved NodeB (eNB), a transmission reception point (TRP), a next generation NodeB (gNB) in NR systems, a base station in other mobile communication systems in the future, or an access node in wireless fidelity (WiFi) systems. Embodiments of the present disclosure do not limit specific technology and specific implementation adopted by the network device. The network device provided in embodiments of the present disclosure can be composed of a central unit (CU) and a distributed unit (DU). The CU can also be referred to as a control unit. The CU-DU structure can be used to separate protocol layers of the network device, such as the base station, with some protocol layer functions placed under centralized control in the CU, and the remaining or all protocol layer functions distributed in the DU. The DU is centrally controlled by the CU.

The terminal device 102 in embodiments of the present disclosure is an entity on the user side used for receiving or sending signals, such as a mobile phone. The terminal device can also be referred to as terminals, user equipment (UE), mobile stations (MS), mobile terminals (MT), etc. The terminal device can be vehicles with communication capabilities, intelligent vehicles, mobile phones, wearable devices, pads, computers with wireless transceiver capabilities, virtual reality (VR) terminal devices, augmented reality (AR) terminal devices, wireless terminal devices in industrial control, wireless terminal devices in self-driving, wireless terminal devices in remote medical surgery, wireless terminal devices in smart grid, wireless terminal devices in transportation safety, wireless terminal devices in smart city, wireless terminal devices in smart home, etc. Embodiments of the present disclosure do not limit specific technology and specific implementation adopted by the terminal device.

It can be understood that the communication system described in embodiments of the present disclosure is intended to provide a clearer explanation of but does not constitute a limitation on technical solutions of embodiments of the present disclosure. It is known to those of ordinary skill in the art, with the evolution of system architectures and the emergence of new business scenarios, technical solutions of embodiments of the present disclosure are also applicable to similar technical problems.

Detailed explanations to a method and an apparatus for adjusting a maximum number of transport layers provided by the present disclosure will be given in the following with reference to the drawings.

Figure 2:
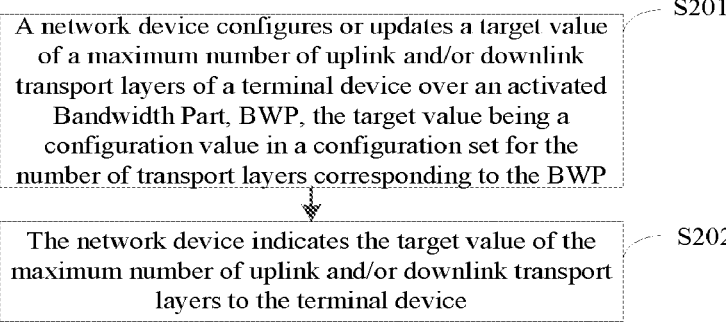
FIG. 2 is a schematic flowchart of a method for adjusting a maximum number of transport layers according to embodi- ments of the present disclosure.

FIG. 2 is a schematic flowchart of a method for adjusting a maximum number of transport layers according to embodiments of the present disclosure. The method is applied to a network device, and as shown in FIG. 2, the method includes following steps.

In step S201, a network device configures or updates a target value of a maximum number of uplink and/or downlink transport layers of a terminal device over an activated Bandwidth Part, BWP, the target value being a configuration value in a configuration set for the number of transport layers corresponding to the BWP.

In embodiments of the present disclosure, the network device can configure one or more Bandwidth Parts, BWPs, for each terminal device, and the terminal device can communicate with the network device on one of the BWPs. That is, when one of the BWPs is activated in the network, the terminal device performs uplink or downlink transmission on the activated BWP. In some embodiments, the network device can configure one or more BWPs for a cell based on the level of the cell, and the terminal device residing in the cell can activate one of the BWPs. In some embodiments, the network device can configure four BWPs for one cell.

In response to changes in the business of the terminal device, for example, in scenarios where the terminal device does not send data temporarily or the amount of the data changes significantly, the terminal device activates a configuration value previously configured for a maximum number of uplink and/or downlink transport layers over the BWP, which may not be suitable for the transmission of the terminal device. The network device can configure or update a target value of the maximum number of uplink and/or downlink transport layers for the terminal device, to meet transmission requirements from the terminal device. In some embodiments, the network device can configure or update the target value of the maximum number of uplink transport layers for the terminal device. In some embodiments, the network device can configure or update the target value of the maximum number of downlink transport layers for the terminal device. In some embodiments, the network device can configure or update target values for the maximum number of uplink and downlink transport layers for the terminal device.

In some embodiments, in scenarios where no data transmission occurs, if the terminal device still uses the previous configuration value configured for the maximum number of uplink and/or downlink transport layers, significant energy consumption would be caused. Therefore, the network device can configure a smaller target value of the maximum number of uplink and/or downlink transport layers for the activated BWP, thereby saving the energy consumption. In some embodiments, in scenarios where significant changes in the amount of the data occur, if the terminal device still uses the previous configuration value configured for the maximum number of uplink and/or downlink transport layers, low data transmission efficiency or data loss would be caused. Therefore, the network device can configure a larger target value of the maximum number of uplink and/or downlink transport layers for the activated BWP, thereby improving the efficiency and completeness of the data transmission.

In some embodiments of the present disclosure, the activated BWP has a configuration set for the number of transport layers, and the configuration set for the number of transport layers includes multiple configuration values of the maximum number of uplink and/or downlink transport layers. In some embodiments, the configuration set for the number of transport layers can include only multiple configuration values of the maximum number of uplink transport layers. Correspondingly, the activated BWP can also have another configuration set for the number of transport layers, which can include multiple configuration values of the maximum number of downlink transport layers. In some embodiments, the activated BWP can include only multiple configuration values of the maximum number of downlink transport layers. Correspondingly, the activated BWP can also have another configuration set for the number of transport layers, which can include multiple configuration values of the maximum number of uplink transport layers. In some embodiments, the configuration set for the number of transport layers can include multiple configuration values of the maximum number of uplink transport layers and multiple configuration values of the maximum number of downlink transport layers.

In some embodiments, the target value of the maximum number of transport layers configured or updated is selected based on the configuration values in the configuration set for the number of transport layers of the terminal device, the configuration set for the number of transport layers corresponding to the activated BWP.

In some embodiments, based on current usage requirements for the network from the terminal device, the network device selects in the configuration set for the number of transport layers of the terminal device corresponding to the activated BWP, a configuration value that can meet the requirements for the terminal device, as the target value of the maximum number of uplink and/or downlink transport layers over the activated BWP.

It should be noted that the target value of the maximum number of uplink transport layers and the target value of the maximum number of downlink transport layers can be the same or different. In some embodiments, in order to achieve optimal resource configuration, the target value of the maximum number of uplink transport layers is smaller than the target value of the maximum number of downlink transport layers.

In step S202, the network device indicates the target value of the maximum number of uplink and/or downlink transport layers to the terminal device.

In embodiments of the present disclosure, the transmission between the terminal device and the network device is achieved through a sending or a reception transmission link. In some embodiments, after the target value of the maximum number of uplink and/or downlink transport layers is determined, it is necessary to notify the terminal device of the determined target value, so that the terminal device can adjust the number of transmission links to achieve energy-saving or fast and complete data transmission.

In some embodiments, the network device indicates to terminal device, the target value of the maximum number of uplink and/or downlink transport layers, through MAC CE signaling. In some embodiments, an encoding value of the target value, or the numbering of the target value in the configuration set for the number of transport layers can be carried in the MAC CE signaling. After obtaining the MAC CE signaling, the terminal device can determine from the configuration set for the number of transport layers the target value of the maximum number of uplink and/or downlink transport layers configured by the network device.

In some embodiments, the network device indicates to the terminal device, the target value of the maximum number of uplink and/or downlink transport layers through DCI signaling. In some embodiments, an encoding value of the target value, or the numbering of the target value in the configuration set for the number of transport layers can be carried in the DCI signaling. After obtaining the DCI signaling, the terminal device can determine from the configuration set for the number of transport layers the target value of the maximum number of uplink and/or downlink transport layers configured by the network device.

According to the method for adjusting the maximum number of transport layers provided in embodiments of the present disclosure, the network device selects from the configuration set for the number of transport layers of the terminal device over the activated BWP one configuration value, configures the selected configuration value as the target value of the maximum number of uplink and/or downlink transport layers for the activated BWP, and indicates the target value to the terminal device. According to the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device through the signaling. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device.

Figure 3:
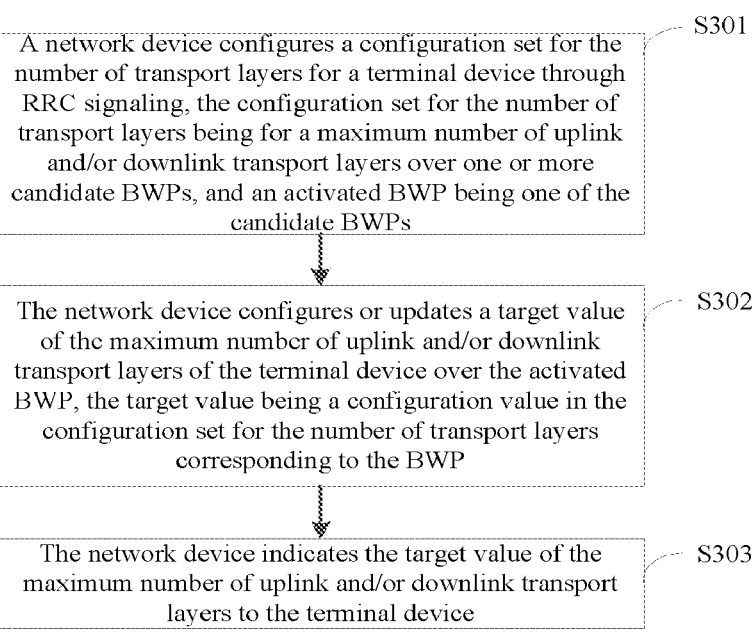
FIG. 3 is a schematic flowchart of a method for adjusting a maximum number of transport layers according to embodi- ments of the present disclosure.

FIG. 3 is a schematic flowchart of a method for adjusting a maximum number of transport layers according to embodiments of the present disclosure. The method is applied to a network device, and as shown in FIG. 3, the method includes following steps.

In step S301, a network device configures a configuration set for the number of transport layers for a terminal device through RRC signaling, the configuration set for the number of transport layers being for a maximum number of uplink and/or downlink transport layers over one or more candidate BWPs, and an activated BWP being one of the candidate BWPs.

In some embodiments, the network device can configure one or more candidate BWPs for a cell based on the level of the cell, and the terminal device residing in the cell corresponds to the candidate BWPs in the cell. In some embodiments, one of the candidate BWPs can be activated based on the business requirements of the terminal device. In some embodiments, when the terminal device is used for video downloading, a BWP with a faster network speed is needed, and thus the network device can activate the BWP with larger bandwidth. In some embodiments, when the terminal device is used for book reading, configuration requirements for the network speed and the network quality are relatively low compared to the video downloading, and thus the network device can activate the BWP with smaller bandwidth.

In embodiments of the present disclosure, the network device configures, through the RRC signaling, one or more BWPs for each terminal device as the candidate BWPs for the terminal device. Each candidate BWP is configured with the configuration set for the number of transport layers, which includes multiple configuration values of the maximum number of uplink and/or downlink transport layers.

In some embodiments, the network device can configure the configuration sets for the number of transport layers for all candidate BWPs simultaneously. In some embodiments, the network device can configure the configuration set(s) for the number of transport layers for one or more candidate BWPs. In some embodiments, configuration values in the configuration sets for the number of transport layers of different candidate BWPs can be the same or different.

It is assumed that the network device configures the configuration set for the number of transport layers for each candidate BWP for the terminal device through the RRC signaling, for example, a configurable configuration set S1 for the number of downlink transport layers over a candidate BWP1 can be configured as {1,2,4,6,8}, where 1,2,4,6 and 8 are possible values of the maximum number of downlink transport layers. In the case where the activated BWP for the terminal device is the candidate BWP1, the network device can select one of the configuration values from the configuration set S1 of the candidate BWP1, and configure the selected configuration value as the target value of the maximum number of uplink and/or downlink transport layers over the candidate BWP1.

It should be noted that the network device can also configure a default value for the maximum number of uplink and/or downlink transport layers for each candidate BWP, respectively. The default value belongs to the configuration set for the number of transport layers.

In some embodiments, the network device can specify one of the configuration values from the configuration set for the number of transport layers for the candidate BWP, as the default value for the maximum number of uplink and/or downlink transport layers for the candidate BWP.

In some embodiments, in the configuration set S1 of the candidate BWP1, the network device can select a default value of 4 as the corresponding default value. When the terminal device activates the candidate BWP1 as the activated BWP, the terminal device can prepare the number of transmission links based on the default value of the maximum number of uplink and/or downlink transport layers for the BWP1. That is, according to the default value, 4, of the maximum number of uplink and/or downlink transport layers for the BWP1, the number of transmission links prepared for sending and/or receiving is 4.

In step S302, the network device configures or updates a target value of the maximum number of uplink and/or downlink transport layers of the terminal device over the activated BWP, the target value being a configuration value in the configuration set for the number of transport layers corresponding to the BWP.

In step S303, the network device indicates the target value of the maximum number of uplink and/or downlink transport layers to the terminal device.

Implementations in any embodiment of the present disclosure can be adopted by steps S302 to S303, and will not be repeated herein.

In some embodiments, the method for adjusting a maximum number of transport layers provided in embodiments of the present disclosure can further include following steps.

In some embodiments, the uplink transmission over Physical Uplink Shared Channel (PUSCH) performed by the terminal device can be achieved based on a codebook scheme or a non-codebook scheme.

In some embodiments, when the configuration set for the number of transport layers is configured with the maximum number of uplink transport layers, in response to the uplink transmission being codebook based uplink PUSCH transmission, the network device can determine for the activated BWP a number of ports for each SRS resource in a SRS resource set used for the codebook based transmission. In some embodiments, the number of ports for each SRS resource in the SRS resource set used for the codebook based transmission can be scheduled and configured for the activated BWP, and the number of ports for each SRS resource should be less than or equal to the target value of the maximum number of transport layers. For example, if the target value is 4, the number of ports for each SRS resource in the SRS resource set used for the codebook based transmission must be less than or equal to 4, that is, a single SRS resource can have a maximum of 4 ports. In some embodiments, the network device can indicate the number of ports for SRS resources that are scheduled and configured for the activated BWP to the terminal device. In some embodiments, the network device can indicate the number of ports for each SRS resource in the SRS resource set configured for the codebook based transmission to the terminal device, through RRC signaling, DCI signaling, or other control signaling.

In some embodiments, when the configuration set for the number of transport layers is configured with the maximum number of uplink transport layers, in response to the uplink transmission being non-codebook based uplink PUSCH transmission, the network device can determine for the activated BWP a number of SRS resources in a SRS resource set used for the non-codebook based transmission. In some embodiments, the number of SRS resources in the SRS resource set used for the non-codebook based transmission can be scheduled and configured for the activated BWP, and the number of SRS resources should be less than or equal to the target value of the maximum number of transport layers. For example, if the target value is 4, the number of SRS resources in each SRS resource set must be less than or equal to 4, that is, the maximum number of resources is 4. In some embodiments, the network device can indicate the number of resources in each SRS resource set that are scheduled and configured for the activated BWP to the terminal device. In some embodiments, the network device can indicate the number of SRS resources in the SRS resource set configured for non-codebook based transmission to the terminal device, through RRC signaling, DCI signaling, or other control signaling.

The method for adjusting the maximum number of transport layers provided in embodiments of the present disclosure allows the network device to configure one or more candidate BWPs for the terminal device through RRC signaling. Each candidate BWP is configured with a configuration set for the number of transport layers of the maximum number of uplink transport layers and a configuration set for the number of transport layers of the maximum number of downlink transport layers. The network device configures the target value of the maximum number of uplink and/or downlink transport layers for the activated BWP for the terminal device, and indicates the target value to the terminal device. According to the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device.

FIG. 4 is a schematic flowchart of a method for adjusting a maximum number of transport layers according to embodiments of the present disclosure. The method is applied to a network device, and as shown in FIG. 4, the method includes following steps.

In step S401, a network device configures a configuration set for the number of transport layers for a terminal device through RRC signaling, the configuration set for the number of transport layers being for a maximum number of uplink and/or downlink transport layers over one or more candidate BWPs, and an activated BWP being one of the candidate BWPs.

In step S402, the network device configures or updates a target value of the maximum number of uplink and/or downlink transport layers of the terminal device over the activated BWP, the target value being a configuration value in the configuration set for the number of transport layers corresponding to the BWP.

Implementations in any embodiment of the present disclosure can be adopted by steps S401 to S402, and will not be repeated herein.

In some embodiments, when the configuration set for the number of transport layers is configured with the maximum number of uplink transport layers, in response to the uplink transmission being codebook based uplink PUSCH transmission, the network device can schedule and configure for the activated BWP a number of ports for each SRS resource in a SRS resource set used for the codebook based transmission, and the number of ports for each SRS resource should be less than or equal to the target value of the maximum number of transport layers. For example, if the target value is 4, the number of ports for each SRS resource should be less than or equal to 4, that is, a single SRS resource can have a maximum of 4 ports. In some embodiments, the network device can indicate the number of ports for SRS resources that are scheduled and configured for the activated BWP to the terminal device. In some embodiments, the network device can indicate the number of ports for each SRS resource in the SRS resource set configured for the codebook based transmission to the terminal device, through RRC signaling, DCI signaling, or other control signaling.

In some embodiments, when the configuration set for the number of transport layers is configured with the maximum number of uplink transport layers, in response to the uplink transmission being non-codebook based uplink PUSCH transmission, the network device can schedule and configure for the activated BWP a number of SRS resources in a SRS resource set used for the non-codebook based transmission, and the number of SRS resources needs to be less than or equal to the target value of the maximum number of transport layers.

In step S403, the network device indicates to the terminal device through MAC CE signaling, to activate the target value of the maximum number of uplink and/or downlink transport layers in the configuration set for the number of transport layers.

Based on scheduling decisions, the network device selects an available configuration value from the configuration set for the number of transport layers corresponding to the activated BWP, as the target value of the maximum number of uplink and/or downlink transport layers over the activated BWP. In some embodiments, an encoding value of the target value, or the numbering of the target value in the configuration set for the number of transport layers can be carried in the MAC CE signaling. After obtaining the MAC CE signaling, the terminal device can determine from the configuration set for the number of transport layers the target value configured by the network device.

The network device then uses MAC CE signaling to indicate to the terminal device the target value of the maximum number of uplink and/or downlink transport layers over the activated BWP, so that the terminal device can adjust the number of transmission links for sending and/or receiving, so as to achieve energy-saving or fast and complete data transmission.

In some embodiments, the method for adjusting a maximum number of transport layers provided in embodiments of the present disclosure can further include following steps.

In step S404, the network device indicates to the terminal device through another MAC CE signaling, to deactivate the target value of the maximum number of uplink and/or downlink transport layers, to restore (for example, activate) the default value configured for the activated BWP.

In embodiments of the present disclosure, the configuration set for the number of transport layers for each BWP includes a default value of the maximum number of transport layers. When the target value of the maximum number of transport layers configured by the network device fails and/or is deactivated, for example, after reaching a configured activation cycle, the target value will be deactivated. In order to ensure the normal use of the terminal device, the network device can once again indicate to the terminal device through MAC CE signaling, to restore (for example, activate) the maximum number of uplink and/or downlink transport layers to the default value, thereby ensuring that the data or information transmission can be carried out between the terminal device and the network device.

According to the method for adjusting the maximum number of transport layers provided in embodiments of the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device through MAC CE signaling. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device. In addition, when the target value fails or is deactivated, the default value is restored to ensure the normal use of the terminal device.

FIG. 5 is a schematic flowchart of a method for adjusting a maximum number of transport layers according to embodiments of the present disclosure. The method is applied to a network device, and as shown in FIG. 3, the method includes following steps.

In step S501, a network device configures a configuration set for the number of transport layers for a terminal device through RRC signaling, the configuration set for the number of transport layers being for a maximum number of uplink and/or downlink transport layers over one or more candidate BWPs, and an activated BWP being one of the candidate BWPs.

In step S502, the network device configures or updates a target value of the maximum number of uplink and/or downlink transport layers of the terminal device over the activated BWP, the target value being a configuration value in the configuration set for the number of transport layers corresponding to the BWP.

Implementations in any embodiment of the present disclosure can be adopted by steps S501 to S502, and will not be repeated herein.

In some embodiments, when the configuration set for the number of transport layers is configured with the maximum number of uplink transport layers, in response to the uplink transmission being codebook based uplink PUSCH transmission, the network device can schedule and configure for the activated BWP a number of ports for each SRS resource in a SRS resource set used for the codebook based transmission, and the number of ports for each SRS resource should be less than or equal to the target value of the maximum number of transport layers. For example, if the target value is 4, the number of ports for each SRS resource should be less than or equal to 4, that is, a single SRS resource can have a maximum of 4 ports. In some embodiments, the network device can indicate the number of ports for SRS resources that are scheduled and configured for the activated BWP to the terminal device. In some embodiments, the network device can indicate the number of ports for each SRS resource in the SRS resource set configured for the codebook based transmission to the terminal device, through RRC signaling, DCI signaling, or other control signaling.

In some embodiments, when the configuration set for the number of transport layers is configured with the maximum number of uplink transport layers, in response to the uplink transmission being non-codebook based uplink PUSCH transmission, the network device can schedule and configure for the activated BWP a number of SRS resources in a SRS resource set used for the non-codebook based transmission, and the number of SRS resources needs to be less than or equal to the target value of the maximum number of transport layers.

In step S503, the network device indicates to the terminal device through DCI signaling, to activate the target value of the maximum number of uplink and/or downlink transport layers in the configuration set for the number of transport layers.

In embodiments of the present disclosure, after determining the target value of the maximum number of transport layers of the terminal device over the activated BWP, the network device can indicate the target value to the terminal device through DCI signaling. In some embodiments, an encoding value of the target value, or the numbering of the target value in the configuration set for the number of transport layers can be carried in the DCI signaling. After obtaining the DCI signaling, the terminal device can determine from the configuration set for the number of transport layers the target value configured by the network device.

The DCI signaling has multiple formats, and the network device can use different formats of DCI signaling for uplink transmission and downlink transmission to indicate the terminal device. In some embodiments, for Physical Downlink Shared Channel (PDSCH) transmission, the network device can use DCI1_1 or DCI1_2, to indicate the target value of the maximum number of downlink transport layers.

In some embodiments, for uplink PUSCH transmission, DCI0_1 or DCI0_2 can be used to indicate the target value of the maximum number of uplink transport layers.

DCI0_1 or DCI0_2, DCI1_1 or DCI1_2 are different formats of DCI signaling, and can carry different amount of information.

According to the method for adjusting the maximum number of transport layers provided in embodiments of the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device through DCI signaling. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device.

FIG. 6 is a schematic flowchart of a method for adjusting a maximum number of transport layers according to embodiments of the present disclosure. The method is applied to a terminal device, and as shown in FIG. 6, the method includes following steps.

In step S601, a terminal device receives signaling sent by a network device, the signaling being used to indicate a target value of a maximum number of uplink and/or downlink transport layers of a terminal device over an activated BWP, and the target value being a configuration value in a configuration set for the number of transport layers corresponding to the BWP.

In embodiments of the present disclosure, the network device can configure one or more BWPs, for each terminal device, and the terminal device can communicate with the network device on one of the BWPs. That is, when one of the BWPs is activated in the network, the terminal device performs uplink or downlink transmission on the activated BWP.

In response to changes in the business of the terminal device, for example, in scenarios where the terminal device does not send data temporarily or the amount of the data changes significantly, the terminal device activates a configuration value previously configured for a maximum number of uplink and/or downlink transport layers over the BWP, which may not be suitable for the transmission of the terminal device. The network device can configure or update a target value of the maximum number of uplink and/or downlink transport layers for the terminal device, to meet transmission requirements from the terminal device.

In some embodiments of the present disclosure, the activated BWP has a configuration set for the number of transport layers, and the configuration set for the number of transport layers includes multiple configuration values of the maximum number of uplink and/or downlink transport layers. In some embodiments, the target value of the maximum number of transport layers configured or updated by the network device is selected from the configuration values in the configuration set for the number of transport layers corresponding to the activated BWP.

In some embodiments, based on current usage requirements for the network from the terminal device, the network device selects in the configuration set for the number of transport layers of the terminal device corresponding to the activated BWP, a configuration value that can meet the requirements for the terminal device, as the target value of the maximum number of uplink and/or downlink transport layers over the activated BWP. It should be noted that the target value of the maximum number of uplink transport layers and the target value of the maximum number of downlink transport layers can be the same or different. In some embodiments, in order to achieve optimal resource configuration, the target value of the maximum number of uplink transport layers is smaller than the target value of the maximum number of downlink transport layers.

In some embodiments, the network device indicates to terminal device, the target value of the maximum number of uplink and/or downlink transport layers, through MAC CE signaling. In some embodiments, the terminal device can receive MAC CE signaling. After obtaining the MAC CE signaling, the terminal device can determine from the configuration set for the number of transport layers the target value of the maximum number of uplink and/or downlink transport layers configured by the network device.

In some embodiments, the network device indicates to the terminal device, the target value of the maximum number of uplink and/or downlink transport layers through DCI signaling. In some embodiments, after obtaining the DCI signaling, the terminal device can determine from the configuration set for the number of transport layers the target value of the maximum number of uplink and/or downlink transport layers configured by the network device.

In step S602, the terminal device determines a number of sending transmission links and/or reception transmission links based on the target value.

In embodiments of the present disclosure, the transmission between the terminal device and the network device is achieved through a sending or a reception transmission link. In some embodiments, after the target value of the maximum number of uplink and/or downlink transport layers is determined, it is necessary to notify the terminal device of the determined target value, so that the terminal device can adjust the number of transmission links to achieve energy-saving or fast and complete data transmission.

According to the method for adjusting the maximum number of transport layers provided in embodiments of the present disclosure, the network device selects from the configuration set for the number of transport layers of the terminal device over the activated BWP one configuration value, configures the selected configuration value as the target value of the maximum number of uplink and/or downlink transport layers for the activated BWP, and indicates the target value to the terminal device. According to the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device.

FIG. 7 is a schematic flowchart of a method for adjusting a maximum number of transport layers according to embodiments of the present disclosure. The method is applied to a terminal device, and as shown in FIG. 7, the method includes following steps.

In step S701, a terminal device receives RRC signaling sent by the network device, the RRC signaling including a configuration set for the number of transport layers of a maximum number of uplink and/or downlink transport layers for at least one candidate BWP.

In some embodiments, the BWP activated by the terminal device is one of the candidate BWPs.

In embodiments of the present disclosure, the network device configures for each terminal device with one or more BWPs, as candidate BWPs for the terminal device, and each candidate BWP is configured with a configuration set for the number of transport layers, which includes multiple configuration values of the maximum number of uplink and/or downlink transport layers. In some embodiments, the terminal device can receive RRC signaling sent by the network device, which carries the configuration set(s) for the number of transport layers for the candidate BWPs. In some embodiments, the network device can configure the configuration set for the number of transport layers for each candidate BWP simultaneously. In some embodiments, the network device can configure the configuration set for the number of transport layers for each candidate BWP separately. In some embodiments, configuration values in the configuration sets for the number of transport layers of different candidate BWPs can be the same or different.

In some embodiments, the uplink transmission over Physical Uplink Shared Channel (PUSCH) performed by the terminal device can be achieved based on a codebook scheme or a non-codebook scheme.

In some embodiments, when the maximum number of uplink transport layers having been configured in the configuration set for the number of transport layers which is configured by the network device, for the uplink transmission being the codebook based uplink PUSCH transmission, the network device can schedule and configure for the activated BWP a number of ports for each SRS resource in a SRS resource set used for the codebook based transmission, and the number of ports for each SRS resource should be less than or equal to the target value of the maximum number of transport layers. For example, if the target value is 4, the number of ports for each SRS resource should be less than or equal to 4, that is, a single SRS resource can have a maximum of 4 ports. In some embodiments, the network device can indicate the number of ports for SRS resources that are scheduled and configured for the activated BWP to the terminal device. In some embodiments, the network device can indicate the number of ports for each SRS resource in the SRS resource set configured for the codebook based transmission to the terminal device, through RRC signaling, DCI signaling, or other control signaling. That is, when the uplink transmission is the codebook based uplink transmission, the terminal device can not only receive the configuration set for the number of transport layers including the maximum number of uplink transport layers, but also receive the number of ports for each SRS resource in the SRS resource set used for the codebook based transmission, configured by the network device for the activated BWP. The number of ports for each SRS resource is less than or equal to the target value.

In some embodiments, when the maximum number of uplink transport layers having been configured in the configuration set for the number of transport layers which is configured by the network device, for the uplink transmission being the non-codebook based uplink PUSCH transmission, the network device can schedule and configure for the activated BWP a number of SRS resources in a SRS resource set used for the non-codebook based transmission, and the number of SRS resources should be less than or equal to the target value of the maximum number of transport layers. For example, if the target value is 4, the number of SRS resources should be less than or equal to 4, that is, the maximum number of resources is 4. In some embodiments, the network device can indicate the number of SRS resources in the SRS resource set that are scheduled and configured for the activated BWP to the terminal device. In some embodiments, the network device can indicate the number of SRS resources in the SRS resource set configured for the non-codebook based transmission to the terminal device, through RRC signaling, DCI signaling, or other control signaling. That is, when the uplink transmission is the non-codebook based uplink transmission, the terminal device can not only receive the configuration set for the number of transport layers including the maximum number of uplink transport layers, but also receive the number of SRS resources in the SRS resource set used for the non-codebook based transmission, configured by the network device for the activated BWP. The number of SRS resources is less than or equal to the target value.

In step S702, the terminal device receives MAC CE signaling sent by the network device, the MAC CE signaling being used to indicate to the terminal device to activate the target value of the maximum number of uplink and/or downlink transport layers in the configuration set for the number of transport layers.

In some embodiments, network devices can carry an encoding value of the target value, or the numbering of the target value in the configuration set for the number of transport layers in the MAC CE signaling, indicate to the terminal device to activate the target value in the configuration set for the number of transport layers corresponding to the BWP. The target value is the value of the maximum number of uplink and/or downlink transport layers.

After obtaining the MAC CE signaling, the terminal device can analyze the encoding value or the numbering in the MAC CE signaling to determine from the configuration set for the number of transport layers the target value configured by the network device.

In step S703, the terminal device determines a number of sending and/or reception transmission links based on the target value.

Implementations in any embodiment of the present disclosure can be adopted by step S703, and will not be repeated herein.

In some embodiments, the method for adjusting a maximum number of transport layers provided in embodiments of the present disclosure can further include following steps.

In step S704, the terminal device receives another MAC CE signaling sent by the network device, the MAC CE signaling being used to indicate to the terminal device to deactivate the target value of the maximum number of uplink and/or downlink transport layers.

In step S705, the terminal device determines again the number of sending and/or reception transmission links, based on the default value of the maximum number of uplink and/or downlink transport layers in the configuration set for the number of transport layers corresponding to the activated BWP.

In embodiments of the present disclosure, the configuration set for the number of transport layers for each BWP includes a default value of the maximum number of transport layers. When the target value of the maximum number of transport layers configured by the network device fails and/or is deactivated, for example, after reaching a configured activation cycle, the target value will be deactivated. In order to ensure the normal use of the terminal device, the network device can once again indicate to the terminal device through MAC CE signaling, to restore (for example, activate) the maximum number of uplink and/or downlink transport layers to the default value, thereby ensuring that the data or information transmission can be carried out between the terminal device and the network device. That is, after receiving another MAC CE signaling, the terminal device can determine that the target value has been invalid or deactivated. The terminal device can then restore to the default value of the maximum number of uplink and/or downlink transport layers in the configuration set for the number of transport layers. Due to the adjustment of the maximum number of transport layers, and in order to ensure that the number of sending and/or reception transmission links matches the current maximum number of transport layers, the terminal device needs to re-determine the number of sending and/or reception transmission links based on the default value.

According to the method for adjusting the maximum number of transport layers provided in embodiments of the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device through MAC CE signaling. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device. In addition, when the target value fails or is deactivated, the default value is restored to ensure the normal use of the terminal device.

FIG. 8 is a schematic flowchart of a method for adjusting a maximum number of transport layers according to embodiments of the present disclosure. The method is applied to a terminal device, and as shown in FIG. 8, the method includes following steps.

In step S801, a terminal device receives RRC signaling sent by the network device, the RRC signaling including a configuration set for the number of transport layers of a maximum number of uplink and/or downlink transport layers for at least one candidate BWP. In some embodiments, the BWP activated by the terminal device is one of the candidate BWPs. Implementations in any embodiment of the present disclosure can be adopted by step S801, and will not be repeated herein.

In step S802, the terminal device receives DCI signaling sent by the network device, the DCI signaling being used to indicate the target value of the maximum number of uplink and/or downlink transport layers in the configuration set for the number of transport layers. In embodiments of the present disclosure, after determining the target value of the maximum number of transport layers of the terminal device over the activated BWP, the network device can indicate the target value to the terminal device through DCI signaling. In some embodiments, an encoding value of the target value, or the numbering of the target value in the configuration set for the number of transport layers can be carried in the DCI signaling. After obtaining the DCI signaling, the terminal device can determine from the configuration set for the number of transport layers the target value configured by the network device.

The DCI signaling has multiple formats, and the network device can use different formats of DCI signaling for uplink transmission and downlink transmission to indicate the terminal device. In some embodiments, for Physical Downlink Shared Channel (PDSCH) transmission, the network device can use DCI1_1 or DCI1_2, to indicate the target value of the maximum number of downlink transport layers.

In some embodiments, for uplink PUSCH transmission, DCI0_1 or DCI0_2 can be used to indicate the target value of the maximum number of uplink transport layers. DCI0_1 or DCI0_2, DCI1_1 or DCI1_2 are different formats of DCI signaling, and can carry different amount of information.

In step S803, the terminal device determines a number of sending and/or reception transmission links based on the target value. Implementations in any embodiment of the present disclosure can be adopted by step S803, and will not be repeated herein.

According to the method for adjusting the maximum number of transport layers provided in embodiments of the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device through DCI signaling. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device.

In above embodiments of the present disclosure, the methods provided in the present disclosure are introduced from the perspectives of the network device and the terminal device. In order to achieve various functions of the methods provided in embodiments of the present disclosure, the network device and the terminal device can include hardware structures and software modules, which are implemented in the form of hardware structures, software modules, or hardware structures plus software modules. Some of the above functions can be implemented in the form of hardware structures, software modules, or hardware structure and software modules.

As shown in FIG. 9, FIG. 9 is schematic structural diagram of an apparatus for adjusting a maximum number of transport layers according to embodiments of the present disclosure. The apparatus 90 for adjusting the maximum number of transport layers can include a transceiver module 901 and a processing module 902.

The transceiver module 901 can include a sending module and/or a receiving module. The sending module is configured to implement a sending function, and the receiving module is configured to implement a receiving function. The transceiver module 901 is configured to implement a sending and/or receiving function.

The apparatus 90 for adjusting the maximum number of transport layers is a network device. The processing module 902 is configured to configure or update a target value of a maximum number of uplink and/or downlink transport layers of a terminal device over an activated Bandwidth Part, BWP, wherein the target value is a configuration value in a configuration set for the number of transport layers corresponding to the BWP.

The transceiver module 901 is configured to indicate the target value of the maximum number of uplink and/or downlink transport layers to the terminal device.

The processing module 902 is further configured to configure, through Radio Resource Control, RRC, signaling, the configuration set for the number of transport layers of the maximum number of uplink and/or downlink transport layers over one or more candidate BWPs for the terminal device, wherein the activated BWP is one of the candidate BWPs.

The processing module 902 is further configured to configure a default value of the maximum number of uplink and/or downlink transport layers for the candidate BWP, wherein the default value belongs to the configuration set for the number of transport layers.

In some embodiments, the transceiver module 901 is further configured to indicate, through Media Access Control Layer Control Element, MAC CE, signaling, to the terminal device to activate the target value of the maximum number of uplink and/or downlink transport layers in the configuration set for the number of transport layers.

In some embodiments, the transceiver module 901 is further configured to indicate, through Downlink Control Information, DCI, signaling, to the terminal device the target value of the maximum number of uplink and/or downlink transport layers in the configuration set for the number of transport layers.

The transceiver module 901 is further configured to indicate, in response to indicating through the MAC CE signaling the target value to the terminal device, by the network device, through another MAC CE signaling, to the terminal device to deactivate the target value of the maximum number of uplink and/or downlink transport layers, to restore (for example, activate) a default value configured for the activated BWP.

The processing module 902 is further configured to schedule and configure, in response to uplink transmission being codebook based uplink transmission, by the network device, for the activated BWP a number of ports for each SRS resource in a Sounding Reference Signal, SRS, resource set used for the codebook based transmission when the configuration set for the number of transport layers is configured with the maximum number of uplink transport layers, such that the number of ports for each SRS resource is less than or equal to the target value, and indicate to the terminal device.

The processing module 902 is further configured to schedule and configure, in response to uplink transmission being non-codebook based uplink transmission, by the network device, for the activated BWP a number of SRS resources in a SRS resource set used for the non-codebook based transmission when the configuration set for the number of transport layers is configured with the maximum number of uplink transport layers, such that the number of SRS resources is less than or equal to the target value, and indicate to the terminal device.

The apparatus 90 for adjusting the maximum number of transport layers can be a terminal device (such as the terminal device in the aforementioned method embodiments), an apparatus in the terminal device, or an apparatus that can be matched and used with the terminal device. In some embodiments, the apparatus 90 for adjusting the maximum number of transport layers can be a network device, an apparatus in the network device, or an apparatus that can be matched and used with the network device.

The apparatus 90 for adjusting the maximum number of transport layers is the terminal device. The transceiver module 901 is configured to receive signaling sent by a network device, wherein the signaling is configured to indicate a target value of a maximum number of uplink and/or downlink transport layers of the terminal device over an activated BWP, wherein the target value is a configuration value in a configuration set for the number of transport layers corresponding to the BWP.

The processing module 902 is configured to determine a number of sending and/or reception transmission links based on the target value.

The transceiver module 901 is further configured to receive RRC signaling sent by the network device, wherein the RRC signaling includes the configuration set for the number of transport layers of the maximum number of uplink and/or downlink transport layers over at least one candidate BWP, and the activated BWP is one of the candidate BWP.

The transceiver module 901 is further configured to receive MAC CE signaling sent by the network device, wherein the MAC CE signaling is configured to indicate to the terminal device to activate the target value of the maximum number of uplink and/or downlink transport layers in the configuration set for the number of transport layers.

The transceiver module 901 is further configured to receive DCI signaling sent by the network device, wherein the DCI signaling is configured to indicate the target value of the maximum number of uplink and/or downlink transport layers in the configuration set for the number of transport layers.

The transceiver module 901 is further configured to receive another MAC CE signaling sent by the network device, wherein the other MAC CE signaling is configured to indicate to the terminal device to deactivate the target value of the maximum number of uplink and/or downlink transport layers.

The processing module 902 is further configured to terminal device to re-determine the number of sending and/or reception transmission links based on a default value of the maximum number of uplink and/or downlink transport layers in the configuration set for the number of transport layers corresponding to the activated BWP.

The transceiver module 901 is further configured to receive, in response to uplink transmission being codebook based uplink transmission, by the terminal device, a number of ports for each SRS resource in a SRS resource set used for the codebook based transmission configured by the network device for the activated BWP, when receiving the configuration set for the number of transport layers including the maximum number of uplink transport layers, wherein the number of ports is less than or equal to the target value.

The transceiver module 901 is further configured to receive, in response to uplink transmission being non-codebook based uplink transmission, by the terminal device, a number of SRS resources in a SRS resource set used for the non-codebook based transmission configured by the network device for the activated BWP, when receiving the configuration set for the number of transport layers including the maximum number of uplink transport layers, wherein the number of SRS resources is less than or equal to the target value.

According to the apparatus for adjusting the maximum number of transport layers provided in embodiments of the present disclosure, the network device configures a configuration set for the number of transport layers for each BWP, and selects and activates a certain BWP for the terminal device based on requirements of the terminal device. A target value of the maximum number of uplink and/or downlink transport layers for the activated BWP is selected based on the network usage requirements of the terminal device, and is indicated to the terminal device. The selected target value of the maximum number of transport layers is selected from configuration values in the configuration set for the number of transport layers corresponding to the activated BWP. In embodiments of the present disclosure, in scenarios where the maximum number of transport layers of the terminal device needs to be adjusted, since the activated BWP is configured with multiple different values of the maximum number of transport layers, the network device can select from multiple configuration values a new target value of the maximum number of uplink and/or downlink transport layers, and indicate the new target value to the terminal device. As a result, the maximum number of transport layers can be adjusted flexibly within the same BWP, there is no need for the terminal device to perform the BWP switching to achieve the adjustment of the maximum number of transport layers, and thus a smaller delay for the adjustment of the maximum number of transport layers can be realized. Since the BWP switching is not needed, the adjustment of the maximum number of transport layers is less affected by the occupancy of system resources, effectively improving the efficiency of the adjustment of the maximum number of transport layers, strengthening the flexibility of the adjustment of the maximum number of transport layers, and achieving the goal of saving the energy consumption of the terminal device.

Figure 10:
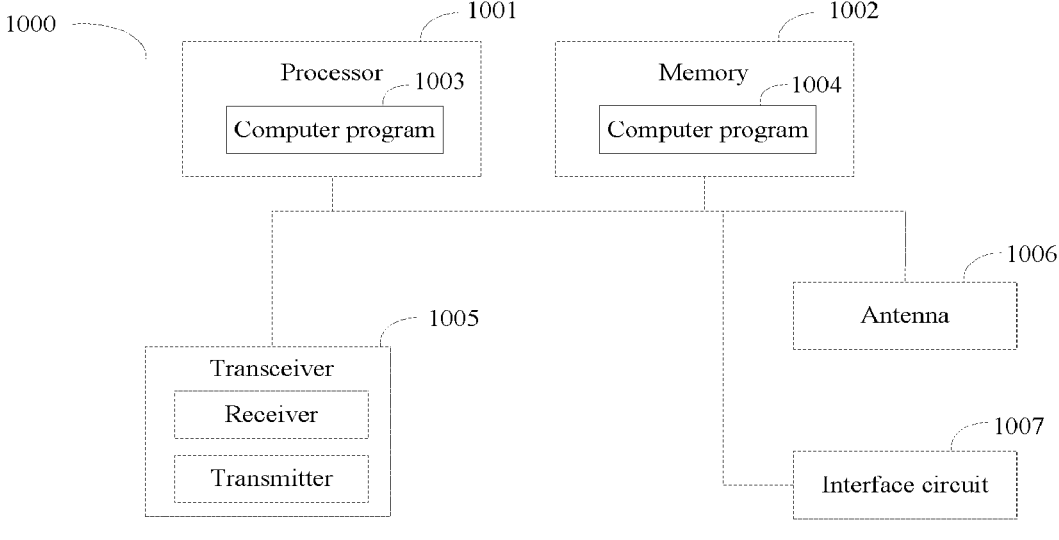
FIG. 10 is a schematic structural diagram of a commu- nication device according to embodiments of the present disclosure.

FIG. 10 is a schematic structural diagram of a communication device according to embodiments of the present disclosure. The communication device 1000 can be a network device or a terminal device. The communication device 1000 can also be a chip, a chip system, or a processor that support the network device to implement the above method, or a chip, a chip system, or a processor that support the terminal device to implement the above method. The apparatus can be used to implement the methods described in the above method embodiments, and specific descriptions can be referred to the above method embodiments.

The communication device 1000 can include one or more processors 1001. Processor 1001 can be a general-purpose processor or a specialized processor, etc. For example, the processor 1001 can be a baseband processor or a central processing unit. The baseband processor can be used to process communication protocols and data, while the central processing unit can be used to control communication devices (such as base stations, baseband chips, terminal devices, terminal device chips, DU or CU, etc.), execute computer programs, and process data from computer programs.

In some embodiments, the communication device 1000 can also include one or more memories 1002, on which computer programs 1004 can be stored, and the processor 1001 can execute computer programs 1004 to cause the communication device 1000 to implement the methods described in the above method embodiments. In some embodiments, the memory 1002 can also store data. The communication device 1000 and the memory 1002 can be arranged separately or integrated together.

In some embodiments, the communication device 1000 can also include a transceiver 1005 and an antenna 1006. The transceiver 1005 can be referred to as a transceiver unit, a transceiver, or a transceiver circuit, etc. The transceiver 1005 can be used to achieve transceiver functions. The transceiver 1005 can include a receiver and a transmitter. The receiver can be referred to as a receiver unit or a receiving circuit, etc., and is used for achieving reception functions. The transmitter can be referred to as a transmitter unit or a transmission circuit, etc., and is used for achieving transmission functions.

In some embodiments, the communication device 1000 can also include one or more interface circuits 1007. The interface circuit 1007 is used to receive code instructions and send the code instructions to a processor 1001. The processor 1001 runs code instructions to cause the communication device 1000 to implement the methods described in the above method embodiments.

The communication device 1000 is a terminal device. The processor 1001 is configured to execute steps S602 in FIG. 6, S703 in FIG. 7, and S803 in FIG. 8, etc. the transceiver 1005 is configured to execute steps S601 in FIG. 6, S701 in FIG. 7, and S801 in FIG. 8, etc.

The communication device 1000 is a network device. The transceiver 1005 is configured to execute steps S202 in FIG. 2, S301 in FIG. 3, S303 in FIG. 3, and S401 in FIG. 4, etc. The processor 1001 is configured to execute steps S201 in FIG. 2, S302 in FIG. 3, and S402 in FIG. 4, etc.

In some embodiments, the processor 1001 can include a transceiver for implementing receiving and sending functions. For example, the transceiver can be a transceiver circuit, an interface, or an interface circuit. The transceiver circuit, the interface, or the interface circuit used to achieve receiving and sending functions can be separate or integrated together. The above-mentioned transceiver circuit, interface or interface circuit can be used for reading and writing codes/data, or the above-mentioned transceiver circuit, interface or interface circuit can be used for signal transmission or transfer.

In some embodiments, the processor 1001 can store computer programs 1003, which can run on the processor 1001 and can cause the communication device 1000 to implement the methods described in the above method embodiments. The computer program 1003 can be embedded in the processor 1001, in which case the processor 1001 can be implemented by hardware.

In some embodiments, the communication device 1000 can include a circuit that can achieve the functions of sending, receiving, or communicating in the above-mentioned method embodiments. The processor and the transceiver described in the present disclosure can be implemented on integrated circuits (ICs), analog ICs, radio frequency integrated circuits (RFICs), mixed signal ICs, application specific integrated circuits (ASICs), printed circuit boards (PCBs), electronic devices, etc. The processor and the transceiver can also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication device described in the above embodiments can be a network device or a terminal device (such as the first terminal device in the above-mentioned method embodiments), but the scope of the communication device described in the present disclosure is not limited to this, and the structure of the communication device may not be limited by FIG. 10. The communication device can be an independent device or can be a part of a larger device. For example, the communication device can be:

(1) Independent integrated circuit ICs, or chips, or chip systems or subsystems.

(2) A set of one or more ICs, optionally, including storage components for storing data and computer programs.

(3) ASICs, such as modems.

(4) Modules that can be embedded in other devices.

(5) Receivers, terminal devices, intelligent terminal devices, cellular phones, wireless devices, handheld devices, mobile units, on-board devices, network devices, cloud devices, artificial intelligence devices, etc.

(6) Others and so on.

Figure 11:
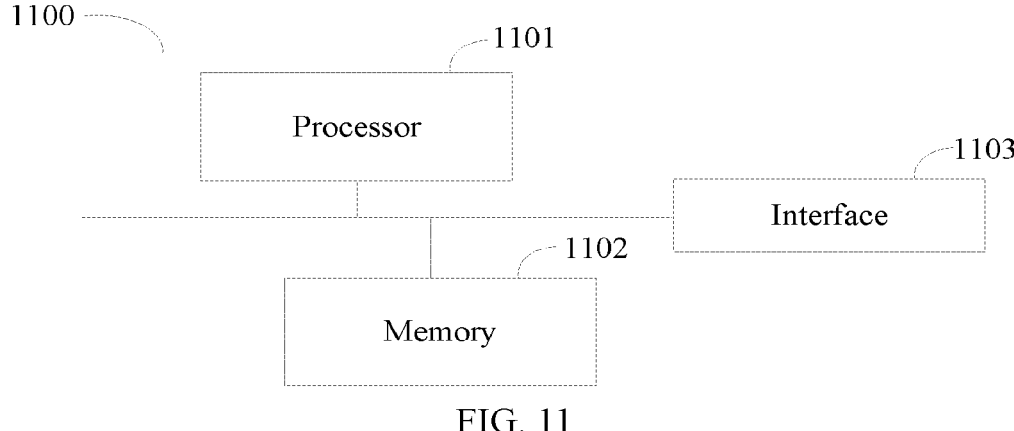
FIG. 11 is a schematic structural diagram of a chip according to embodiments of the present disclosure.

For the communication device that can be chips or chip systems, references can be made to the schematic diagram of the chip structure shown in FIG. 11. The chip shown in FIG. 11 includes a processor 1101 and an interface 1102. The number of the processor 1101 can be one or more, and the number of the interface 1102 can be multiple.

For the case where the chip is used to implement the functions of the terminal device in the embodiments of the present disclosure: the interface 1102 is configured to execute steps S601 in FIG. 6, S701 in FIG. 7, and S801 in FIG. 8, etc.

For the case where the chip is used to implement the functions of the network device in the embodiment of the present disclosure: the interface 1102 is configured to execute steps S202 in FIG. 2, S301 in FIG. 3, S303 in FIG. 3, and S401 in FIG. 4, etc.

In some embodiments, the chip also includes a memory 1103, which is used to store necessary computer programs and data.

Technicians in this field can also understand that the various illustrative logical blocks and steps listed in the embodiments of the present disclosure can be implemented through electronic hardware, computer software, or a combination of the two. Whether such functions are implemented through hardware or software depends on the specific application and overall system design requirements. Technicians in this field can use various methods to implement functions for each specific application, but such implementation should not be understood as exceeding the scope of protection in the embodiments of the present disclosure.

The present disclosure embodiment also provides an adjustment system for the maximum number of transport layers, which includes a communication device as a terminal device (such as the terminal device in the aforementioned method embodiment) in the aforementioned embodiment of FIG. 9 and a communication device as a network device, or the system includes a communication device as a terminal device (such as the terminal device in the aforementioned method embodiment) in the aforementioned embodiment of FIG. 10 and a communication device as a network device.

The present disclosure also provides a readable storage medium on which instructions are stored, which, when executed by a computer, implement the functions of any of the above method embodiments.

The present disclosure also provides a computer program product that implements the functions of any of the above method embodiments when executed by a computer.

In the above embodiments, it can be fully or partially implemented through software, hardware, firmware, or any combination thereof. When implemented using software, it can be fully or partially implemented in the form of computer program products. Computer program products include one or more computer programs. When loading and executing computer programs on a computer, all or part of the processes or functions according to the embodiments of the present disclosure are generated. Computers can be general-purpose computers, specialized computers, computer networks, or other programmable devices. Computer programs can be stored on computer readable storage media or transmitted from one computer readable storage medium to another, for example, computer programs can be transmitted from a website, computer. The server or data center transmits data to another website site, computer, server, or data center through wired (such as coaxial cable, fiber optic, digital subscriber line (DSL)) or wireless (such as infrared, wireless, microwave, etc.) methods. A computer-readable storage medium can be any available medium that a computer can access, or a data storage device such as a server or data center that contains one or more available media integrations. The available media can be magnetic media (such as floppy disks, hard drives, magnetic tapes), optical media (such as high-density digital video discs (DVDs)), or semiconductor media (such as solid state disks (SSDs)), etc.

Ordinary technical personnel in this field can understand that the first, second, and other numerical numbers involved in the present disclosure are only for the convenience of description and differentiation, and are not used to limit the scope of the embodiments of the present disclosure, but also indicate the order of order.

At least one in the present disclosure can also be described as one or more, and multiple can be two, three, four, or more, without limitation in the present disclosure. In the embodiment of the present disclosure, for a technical feature, the technical features described in "first", "second", "third", "A", "B", "C", and "D" are distinguished by the technical features described in "first", "second", "third", "A", "B", "C", and "D" without any order of order or magnitude.

The corresponding relationships shown in each table in the present disclosure can be configured or predefined. The values of information in each table are only examples and can be configured to other values, which are not limited in the present disclosure. When configuring the correspondence between information and various parameters, it is not necessarily necessary to configure all the correspondence shown in each table. For example, in the table in the present disclosure, the corresponding relationships shown in certain rows may not be configured. For example, appropriate deformation adjustments can be made based on the above table, such as splitting, merging, etc. The names of the parameters shown in the titles of the above tables can also use other names that can be understood by the communication device, and the values or representations of the parameters can also be understood by the communication device. When implementing the above tables, other data structures can also be used, such as arrays, queues, containers, stacks, linear tables, pointers, linked lists, trees, graphs, structures, classes, heaps, hash lists, or hash tables.

The pre-defined terms in the present disclosure can be understood as defined, pre-defined, stored, pre-stored, pre-negotiated, pre-configured, solidified, or pre-fired.

Ordinary technical personnel in this field can realize that the units and algorithm steps of each example described in combination with the disclosed embodiments in this article can be implemented in electronic hardware, or a combination of computer software and electronic hardware. Whether these functions are executed in hardware or software depends on the specific application and design constraints of the technical solution. Professional technicians may use different methods to implement the described functions for each specific application, but such implementation should not be considered beyond the scope of the present disclosure.

Technicians in the field can clearly understand that for the convenience and conciseness of the description, the specific working processes of the system, device, and unit described above can refer to the corresponding processes in the aforementioned method embodiments, and will not be repeated here.

The above is only the specific implementations of the present disclosure, but the scope of protection of the present disclosure is not limited to this. Those of killed familiar with this technical field who can easily think of changes or replacements within the scope of technology disclosed in the present disclosure should be covered within the scope of protection of the present disclosure. Therefore, the protection scope of the present disclosure should be based on the protection scope of the claims.

Obviously, numerous modifications and variations of the present invention are possible in light of the above teachings. It is therefore to be understood that within the scope of the appended claims, the invention may be practiced otherwise than as specifically described herein.

What is claimed is:

1. A method for adjusting a maximum number of transport layers, comprising:

configuring or updating, by a network device, a target value of at least one of a maximum number of uplink transport lavers or a maximum number of downlink transport layers of a terminal device over an activated BWP, wherein the target value is selected in a configuration set for a number of transport layers corresponding to the BWP, the configuration set for a number of transport layers comprises multiple possible values of the maximum number of uplink transport lavers and the maximum number of downlink transport layers, and the target value of the maximum number of uplink transport layers is smaller than the target value of the maximum number of downlink transport layers; and indicating, by the network device, the target value of at least one of the maximum number of uplink transport layers or the maximum number of downlink transport layers to the terminal device.

2. The method according to claim 1, further comprising:

configuring, by the network device, through RRC signaling, the configuration set for a number of transport layers over at least one candidate BWP for the terminal device, the activated BWP being one of the at least one candidate BWP.

3. The method according to claim 2, further comprising:

configuring, by the network device, a default value of at least one of the maximum number of uplink transport layers or the maximum number of downlink transport layers for the candidate BWP, wherein the default value belongs to the configuration set for a number of transport layers.

4. The method according to claim 1, wherein indicating, by the network device, the target value of at least one of the maximum number of uplink transport layers or the maximum number of downlink transport layers to the terminal device comprises:

indicating, by the network device, through a first MAC CE signaling, to the terminal device to activate the target value of at least one of the maximum number of uplink transport layers or the maximum number of downlink transport layers in the configuration set for a number of transport layers corresponding to the BWP; or indicating, by the network device, through DCI signaling, to the terminal device the target value of at least one of the maximum number of uplink transport layers or the maximum number of downlink transport layers in the configuration set for a number of transport layers corresponding to the BWP.

5. The method according to claim 4, further comprising:

indicating, in response to indicating through the first MAC CE signaling the target value to the terminal device, by the network device, through a second MAC CE signaling, to the terminal device to deactivate the target value of at least one of the maximum number of uplink transport layers or the maximum number of downlink transport layers, to activate a default value configured for the BWP.

6. The method according to claim 1, further comprising:

scheduling and configuring, in response to uplink transmission being codebook based uplink transmission, by the network device, for the activated BWP a number of ports for each SRS resource in a SRS resource set used for the codebook based transmission, such that the number of ports for each SRS resource is less than or equal to the target value of the maximum number of uplink transport layers, and indicating to the terminal device.

7. The method according to claim 1, further comprising:

scheduling and configuring, in response to uplink transmission being non-codebook based uplink transmission, by the network device, for the activated BWP a number of SRS resources in a SRS resource set used for the non-codebook based transmission, such that the number of SRS resources is less than or equal to the target value of the maximum number of uplink transport layers, and indicating to the terminal device.

8. A method for adjusting a maximum number of transport layers, comprising:

receiving, by a terminal device, signaling sent by a network device, wherein the signaling is configured to indicate a target value of at least one of a maximum number of uplink transport layers or a maximum number of downlink transport layers of the terminal device over an activated BWP, wherein the target value is selected in a configuration set for a number of transport layers corresponding to the BWP, the configuration set for a number of transport layers comprises multiple possible values of the maximum number of uplink transport layers and the maximum number of downlink transport layers, and the target value of the maximum number of uplink transport layers is smaller than the target value of the maximum number of downlink transport layers; and determining, by the terminal device, at least one of a number of sending transmission links or a number of reception transmission links based on the target value.

9. The method according to claim 8, further comprising:

receiving, by the terminal device, RRC signaling sent by the network device, wherein the RRC signaling comprises the configuration set for a number of transport layers over at least one candidate BWP for the terminal device, the activated BWP being one of the at least one candidate BWP.

10. The method according to claim 8, wherein receiving, by the terminal device, the signaling sent by the network device comprises:

receiving, by the terminal device, a first MAC CE signaling sent by the network device, wherein the first MAC CE signaling is configured to indicate to the terminal device to activate the target value of at least one of the maximum number of uplink transport layers or the maximum number of downlink transport layers in the configuration set for a number of transport layers corresponding to the BWP; or receiving, by the terminal device, DCI signaling sent by the network device, wherein the DCI signaling is configured to indicate the target value of at least one of the maximum number of uplink transport layers or the maximum number of downlink transport layers in the configuration set for a number of transport layers corresponding to the BWP.

11. The method according to claim 10, further comprising:

receiving, by the terminal device, a second MAC CE signaling sent by the network device, wherein the second MAC CE signaling is configured to indicate to the terminal device to deactivate the target value of at least one of the maximum number of uplink transport layers or the maximum number of downlink transport layers; and re-determining, by the terminal device, at least one of the number of sending transmission links or the number of reception transmission links based on a default value of at least one of the maximum number of uplink transport layers or the maximum number of downlink transport layers in the configuration set for a number of transport layers corresponding to the BWP.

12. The method according to claim 9, further comprising:

receiving, in response to uplink transmission being codebook based uplink transmission, by the terminal device, a number of ports for each SRS resource in a SRS resource set used for the codebook based transmission configured by the network device for the activated BWP, wherein the number of ports is less than or equal to the target value of the maximum number of uplink transport layers.

13. The method according to claim 9, further comprising:

receiving, in response to uplink transmission being non-codebook based uplink transmission, by the terminal device, a number of SRS resources in a SRS resource set used for the non-codebook based transmission configured by the network device for the activated BWP, wherein the number of SRS resources is less than or equal to the target value of the maximum number of uplink transport layers.

14. A communication device, comprising a processor and a memory, wherein a computer program is stored in the memory, and the processor is configured to configure or update a target value of at least one of a maximum number of uplink transport layers or a maximum number of downlink transport layers of a terminal device over an activated BWP, wherein the target value is selected in a configuration set for a number of transport layers corresponding to the BWP, the configuration set for a number of transport layers comprises multiple possible values of the maximum number of uplink transport layers and the maximum number of downlink transport layers, and the target value of the maximum number of uplink transport layers is smaller than the target value of the maximum number of downlink transport layers; and indicate the target value of at least one of the maximum number of uplink transport layers or the maximum number of downlink transport layers to the terminal device.

15. A communication device, comprising a processor and a memory, wherein a computer program is stored in the memory, and the processor is configured to execute the computer program stored in the memory to cause the method according to claim 8 to be implemented by the device.

16. A non-temporary computer-readable storage medium for storing instructions, which when executed, cause the method according to claim 1 to be implemented.

17. A non-temporary computer-readable storage medium for storing instructions, which when executed, cause the method according to claim 8 to be implemented.

18. The communication device according to claim 14, wherein the processor is further configured to:

indicate, through a first MAC CE signaling, to the terminal device to activate the target value of at least one of the maximum number of uplink transport layers or the maximum number of downlink transport layers in the configuration set for a number of transport layers corresponding to the BWP; or indicate, through DCI signaling, to the terminal device the target value of at least one of the maximum number of uplink transport layers or the maximum number of downlink transport layers in the configuration set for a number of transport layers corresponding to the BWP.

19. The method according to claim 1, wherein indicating, by the network device, the target value of at least one of the maximum number of uplink transport layers or the maximum number of downlink transport layers to the terminal device comprises:

indicating, by the network device, through different formats of DCI signaling, to the terminal device the target value of the maximum number of uplink transport layers and the target value of the maximum number of downlink transport layers, respectively.

20. The method according to claim 8, wherein receiving, by the terminal device, the signaling sent by the network device comprises:

receiving, by the terminal device, different formats of DCI signaling sent by the network device, wherein the different formats of DCI signaling are configured to indicate the target value of the maximum number of uplink transport layers and the target value of the maximum number of downlink transport layers, respectively.

* * * * *